United States Patent [19]

Davenport

[11] Patent Number: 5,739,612

[45] Date of Patent: Apr. 14, 1998

[54] AUXILIARY POWER SOURCE

[76] Inventor: Norban Earl Davenport, 1677 Alta Vista Dr., Bullhead City, Ariz. 86442

[21] Appl. No.: 711,325

[22] Filed: Sep. 3, 1996

[51] Int. Cl.$^6$ .................................................. H02K 47/04
[52] U.S. Cl. ...................... 310/113; 310/112; 310/114; 310/74
[58] Field of Search .................... 310/112, 113, 310/114, 118, 74, 67 R

[56] References Cited

U.S. PATENT DOCUMENTS

| | | | |
|---|---|---|---|
| 4,031,421 | 6/1977 | Geiger | 310/112 |
| 4,057,736 | 11/1977 | Jeppson | 307/78 |
| 4,280,072 | 7/1981 | Gotou et al. | 310/67 R |
| 4,755,698 | 7/1988 | Frister et al. | 310/51 |
| 4,885,492 | 12/1989 | Van Sickle | 310/113 |
| 5,454,936 | 10/1995 | Davenport | 310/12 |

Primary Examiner—Steven L. Stephan
Assistant Examiner—Timothy A. Williams
Attorney, Agent, or Firm—Warren F. B. Lindsley

[57] ABSTRACT

An auxiliary power source comprising a generator driven by an electric motor or other drive means, the rotor of the generator has multiple core elements mounted side-by-side to provide a large number of poles and accordingly, a relatively high output frequency. Specially dimensioned pole faces eliminate cyclic air gap reluctance variations as an audible noise source.

5 Claims, 5 Drawing Sheets

AUXILIARY POWER SOURCE

BACKGROUND OF THE INVENTION

Numerous applications exist for auxiliary power sources that are not subject to one or more of the limitations of conventional utility power. Computer systems, for example, need to be isolated from switching noise and short-term drop-outs that commonly occur on utility power lines. Large office buildings require backup power to supply emergency lighting in the event of a utility power outage or interruption.

Such auxiliary power sources typically comprise motor-generator sets. The motor may be driven by utility power with short-term ride through enhanced by a flywheel. For long-term ride through, a battery bank or other energy storage means may be provided ahead of the drive motor.

For many applications, the 50 or 60 Hertz utility power frequency is not ideal. Higher power frequencies permit significant reductions in the size and weight of magnetic components such as transformer and chokes incorporated in computer power supplies. Fluorescent lighting operates more efficiently at higher frequencies, producing more lumens per watt of input power. High frequency ballasts for fluorescent lighting are also smaller and lighter in weight than those for 50 or 60 Hertz lighting.

For many applications, it is also highly desirable to minimize audible noise produced by such auxiliary power equipment.

This invention is directed toward the provision of improved auxiliary power sources which are characterized by high efficiency, elevated frequency and low audible noise.

DESCRIPTION OF THE PRIOR ART

Motor-generator sets have been utilized for a number of years to power large-scale computer systems. For the most part, however, such motor-generator sets are designed to deliver 60 Hertz output power. Moreover, the generators incorporated in such computer power systems are ordinarily of conventional designs that do not include certain novel features which are incorporated in the present invention for enhanced performance.

U.S. Pat. Nos. 4,885,492 and 5,454,936 disclose prior art motors and generators intended for similar applications. The motors and generators do not incorporate the novel features of the invention.

SUMMARY OF THE INVENTION

In accordance with the invention claimed, a novel electric generator is provided for use as an auxiliary power source, the generator having certain characteristics which render it superior to the conventional 60 Hz generator for various applications.

It is, therefore, one object of the present invention to provide an improved electric generator for use as an element of an auxiliary power system.

Another object of the invention is to provide such an electric generator which is capable of delivering output voltages at frequencies considerably higher than 60 Hz at relatively low rotational velocities.

A further object of the invention is to provide such a generator which produces relatively low audible noise.

A still further object of the invention is to provide a novel generator rotor structure which facilitates the incorporation of a relatively large number of field poles in order to achieve the elevated output frequency at relatively low rotational velocity.

Yet another object of the invention is to provide such a novel generator structure which enables the incorporation of means for reducing audible noise generated by magnetostriction in the rotor iron.

Further objects and advantages of the invention will become apparent as the following description proceeds, and the features of novelty which characterize the invention will be pointed out with particularity in the claims annexed to and forming a part of this specification.

BRIEF DESCRIPTION OF THE DRAWINGS

The present invention may be more readily described by reference to the accompanying drawings in which:

FIG. 8 is a side view of a modified rotor structure shown partially cut away to reveal details of a first alternate arrangement for exciting the rotor core;

FIG. 9 is a side view of another modified rotor structure shown partially cut away to reveal details of a second alternate arrangement for exciting the rotor core;

DESCRIPTION OF THE PREFERRED EMBODIMENT

Figure 1:
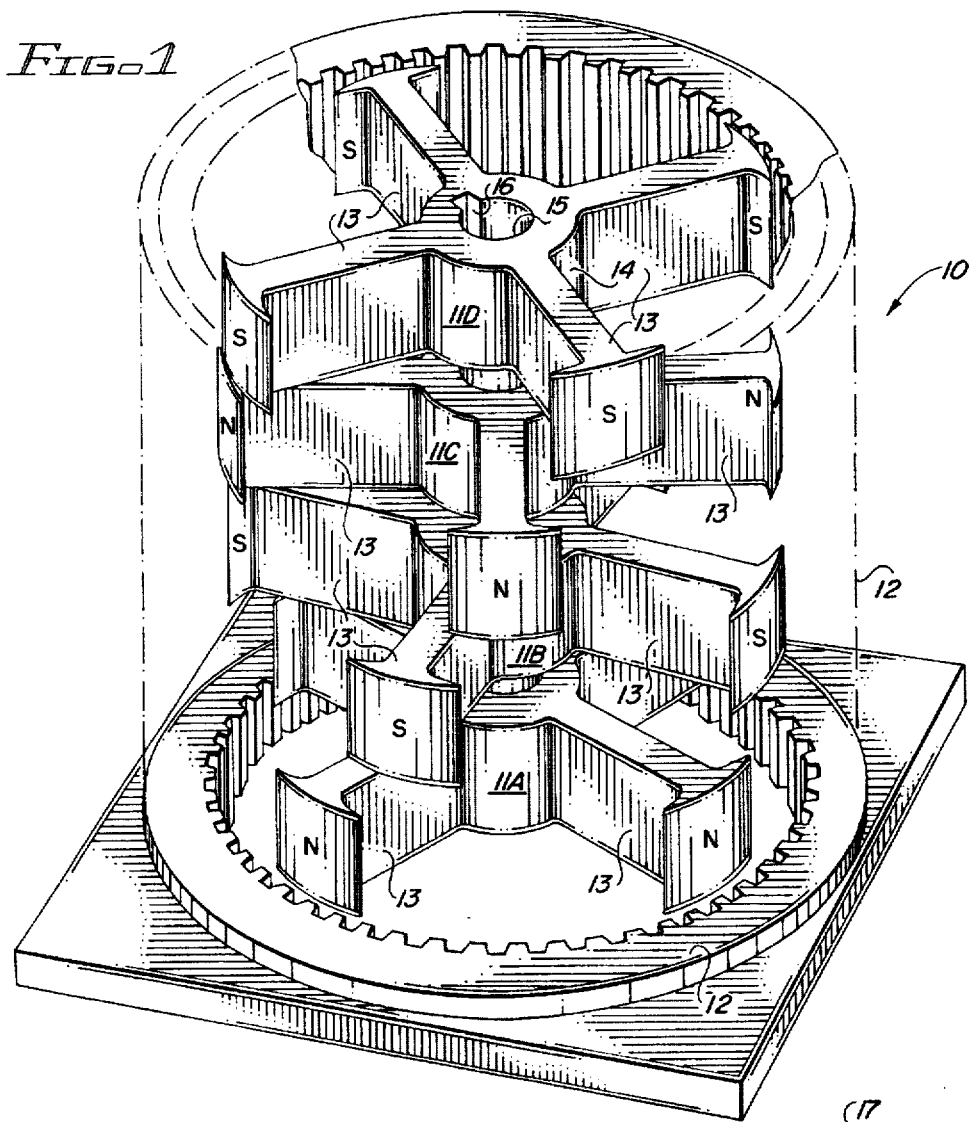
FIG. 1 is a perspective view of the rotor structure with field windings and other structural elements omitted, thereby to clarify the rotor core configuration.

Referring more particularly to the drawings by characters of reference, FIG. 1 discloses the novel rotor core structure 10 of the invention, the structure 10 comprising four rotor core elements 11A–11D in a stacked relationship illustrative of their relative positions and orientations in a final assembly. The stator core 12, partially shown, extends the full length/height of the stacked rotor core elements. Rotor and stator windings and the rotor drive shaft are omitted in FIG. 1 to reveal the core geometry.

Each of the four core elements 11A–11D has four legs 13 which extend radially outward from a hub 14 at 90 degree spacings. A keyed opening 15 for the generator drive shaft passes through the center of the hub 14 at right angles to the four leg extensions.

In the vertical mounting orientation shown in FIG. 1, the drive shaft (not shown) passes vertically through vertically aligned openings 15 of the four core elements 11A-11D. As shown for the upper core element 11, each of the openings 15 has a key slot 16 which controls and retains the rotational orientation of the core element about the shaft. Each of the four core elements has its key slot specially located so as to set the relative orientations shown in FIG. 1 wherein adjacent legs 13 of vertically adjacent core elements 11 are displaced 22.5 degrees from each other as measured rotationally about the center of the vertical opening 15. The four core elements 11 are also spaced apart vertically upon the vertical shaft to allow room for windings that are to be applied to the four legs of each core element.

Figure 2:
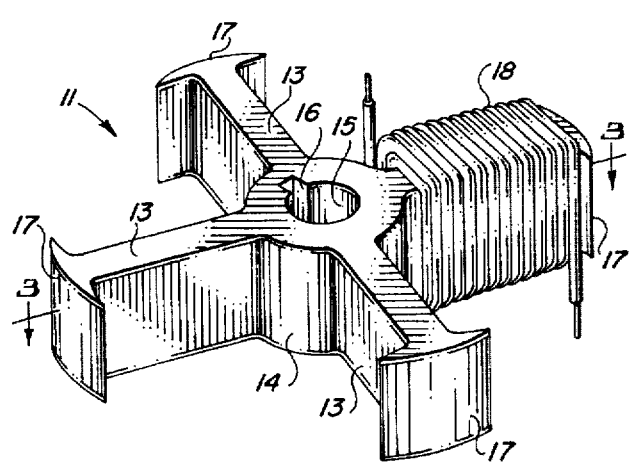
FIG. 2 is a perspective view of an element of the rotor structure of FIG. 1 showing a winding applied to one of the four poles provided by the element shown.

As shown most clearly in FIG. 2, each of the rotor core elements 11 comprises a stack of lamination made from a suitable magnetic material. Each of the four legs 13 is terminated at its outer extremity in a pole face 17 that is flared at its sides to span the desired number of stator teeth plus an additional stator winding opening, as will be explained later. The outer surfaces of the pole faces are curved to match the curvature of the stator core surface.

The portion of leg 13 between hub 14 and the flared pole face 17 has a uniform rectangular cross-section as appropriate for the application of the field winding 18, one of which is shown. One such field winding 18 is wound on each of the four legs 13 as shown in the cross-sectional drawing of FIG. 3.

Figure 4:
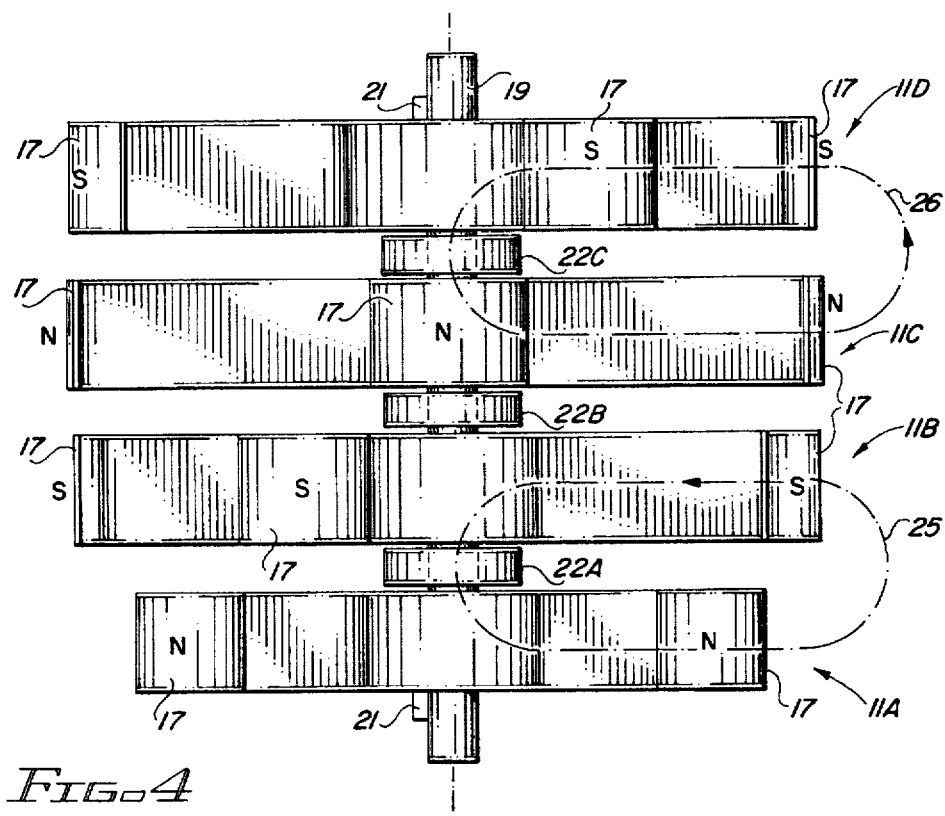
FIG. 4 is a side view of the rotor structure of FIG. 1 with a drive shaft added and with magnetic spacers incorporated between the four rotor core elements.

In the side view of the rotor core structure 10 shown in FIG. 4, the rotor drive shaft 19 has been installed together with a key pin 21 to insure the coaxial and rotational alignment of the four rotor core elements 11. The longitudinal spacing, or the spacing between adjacent core elements is secured by means of spacer rings 22A-22C.

Figure 5:
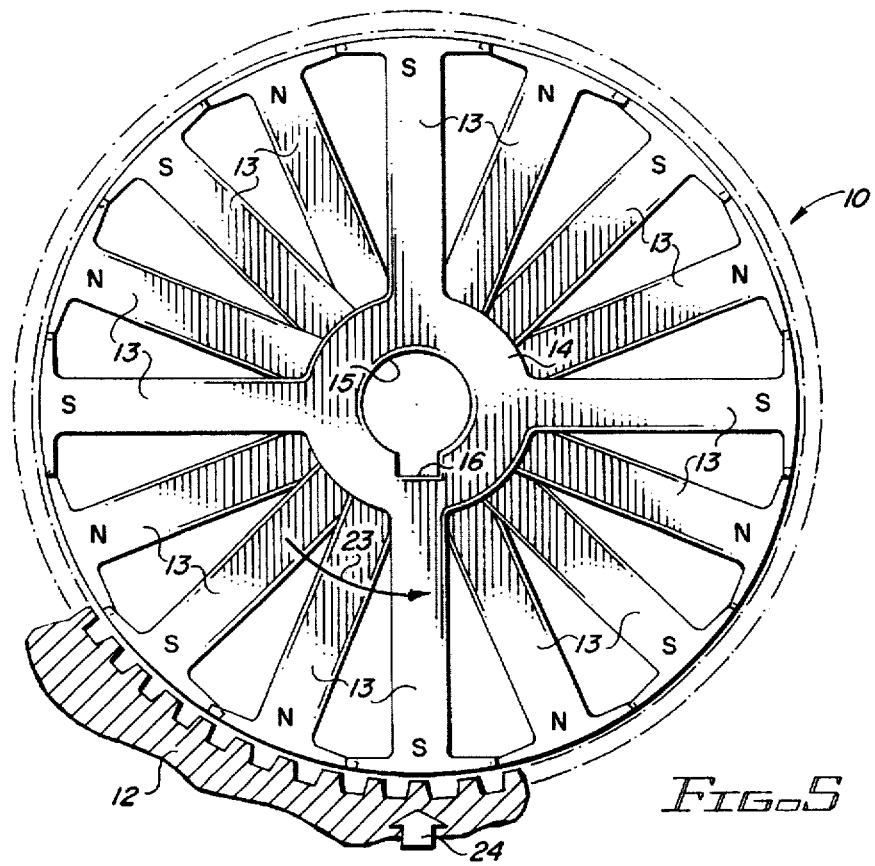
FIG. 5 is a top or end view of the rotor structure of FIG. 1 for the clarification of the relative positional orientation of the four rotor core elements of FIG. 1.
Figure 6:
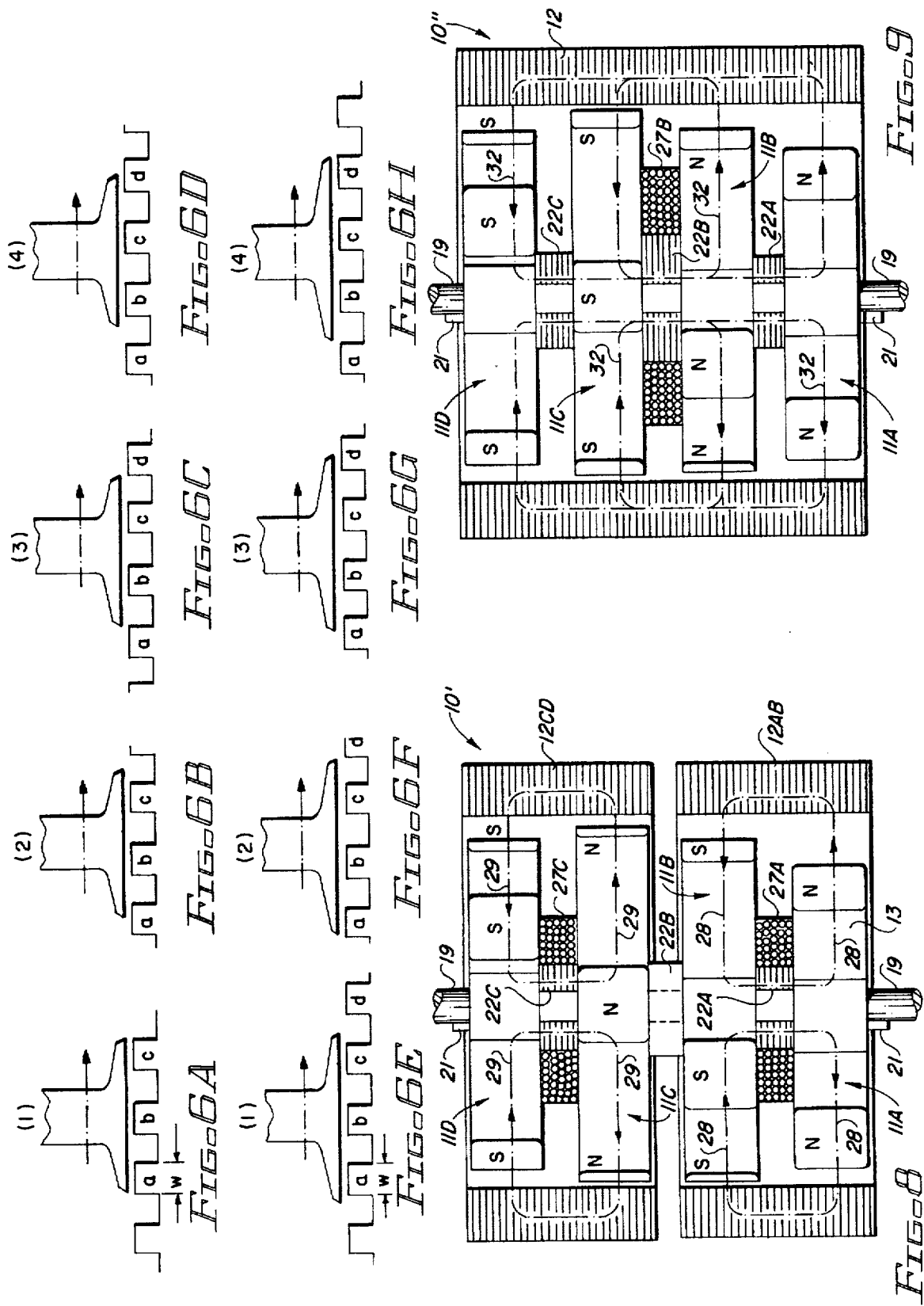
FIGS. 6A–6H illustrate the means by which magnetostriction and therefore audible noise is minimized in the novel rotor structure of the invention.

As shown in FIGS. 1 and 4, the bottom core element 11A has four north (N) poles, the next element 11B has four south (S) poles, the next element 11C has four north (N) poles and the top element 11D has four south (S) poles. This arrangement is achieved by appropriately polarizing the windings that are applied to the legs 13; this arrangement is necessary in order to achieve the alternating N and S poles about the periphery of the rotor as shown in FIG. 5. With this arrangement, the rotor flux 25 emanating from the N poles 17 of rotor element 11A as shown in FIG. 4 passes through the stator core, enters the S poles of rotor element 11B and returns to element 11A via the spacer 22A which, in this case, must be made of a magnetic material. Similarly, flux from the N poles of element 11C passes through the stator core, enters the S pole of element 11D and returns to element 11C via spacer 22C.

Figure 3:
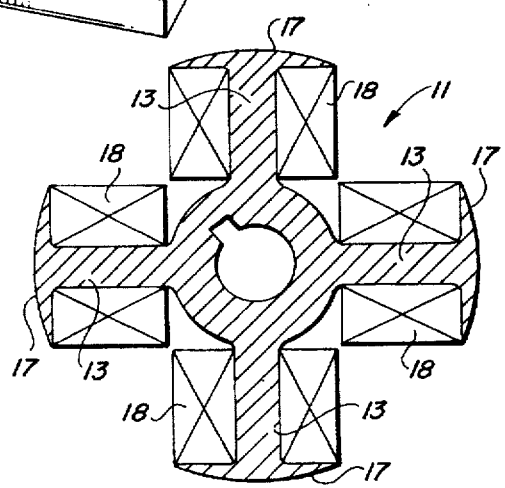
FIG. 3 is a cross-sectional view of FIG. 2 taken along the line 3—3 with windings applied to all four poles of the element.
Figure 11:
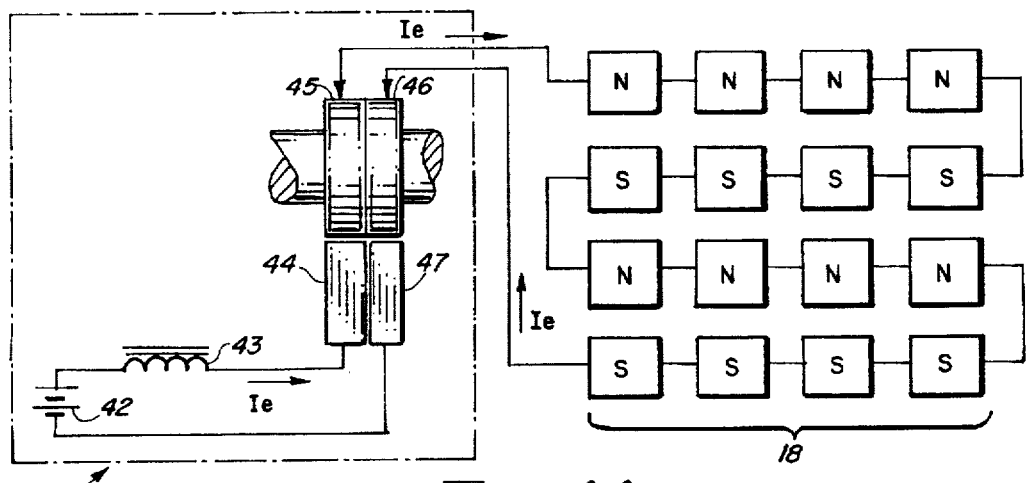
FIG. 11 illustrates the excitation of the field windings by means of excitation current Ie.

Excitation of the field windings 18 to produce the north (N) and south (S) poles as shown in FIGS. 1, 2 and 3 is provided as shown in FIG. 11.

The excitation means 41 comprises an external direct current source 42 which supplies an excitation current Ie, preferably through a series choke 43, to the serially connected field windings 18 of the N and S poles. The current, Ie, flows from the positive terminal of source 42, through choke 43, through a first brush 44 and slip ring 45, through the serially connected windings 18 and returns to the negative terminal of source 42 via a second slip right 46 and a second brush 47. Appropriate phasing of the individual windings produces the north and the south pole at each location.

The d-c source is shown as a battery but it may comprise a d-c supply derived by rectification and filtering of an alternating current source.

The output voltage of the generator 10 is induced in armature windings installed in the slots of armature 12. The armature windings are omitted in the illustration of FIG. 1 in order not to obscure the rotor core configuration.

Figure 12:
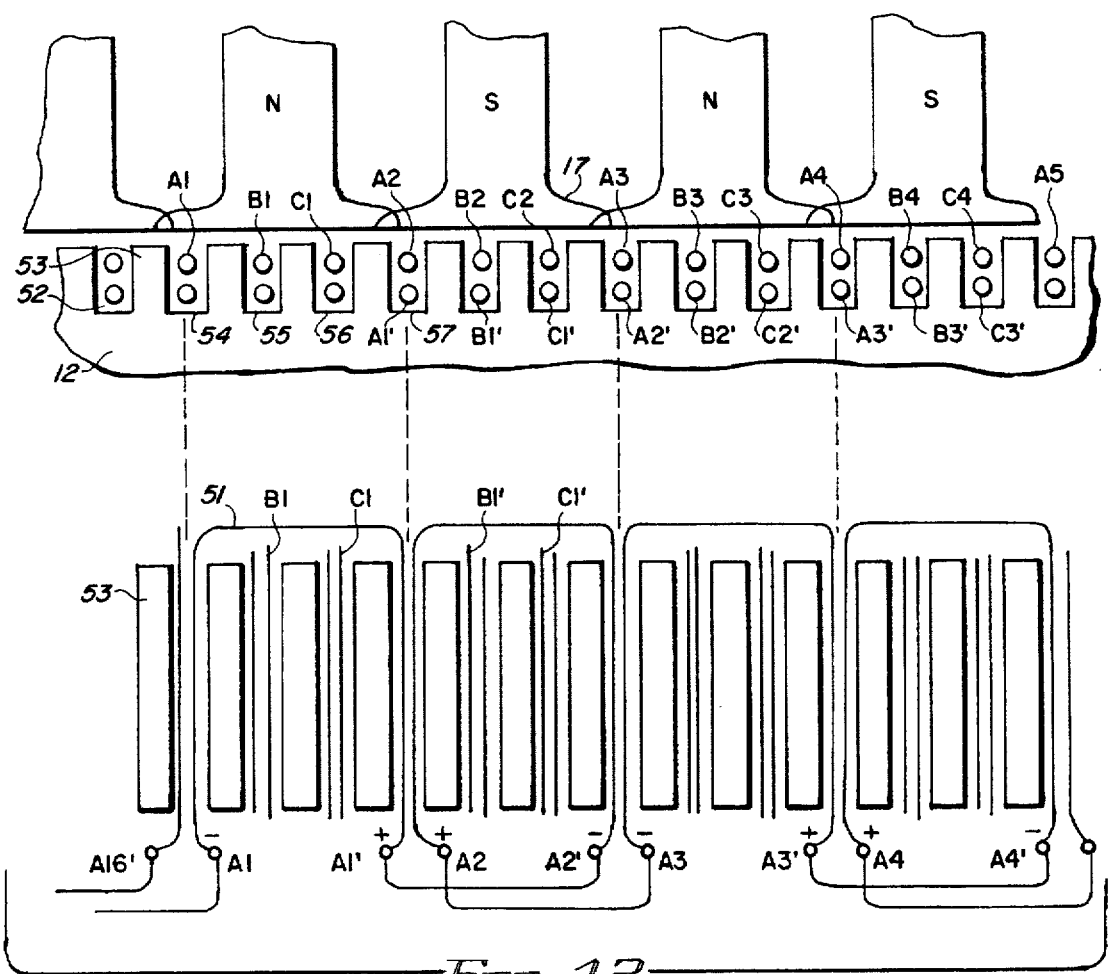
FIG. 12 illustrates in the upper portion of the figure and end view of the armature in relationship with the rotor poles and the lower portion of the figure illustrates a plan view of the armature face and windings.

A three-phase armature winding 51 suitable for use in the practice of the present invention is illustrated in FIG. 12. To facilitate the illustration, a linear representation of the pole faces and the armature core is employed.

The upper portion of FIG. 12 shows an end view of the armature in relationship with the rotor poles and the lower portion shows a plan view of the armature face and the windings.

To further simplify the illustration, single-turn windings of the phase A are shown together with their interconnections while for phase B and C, only the positions of the windings are shown. The interconnections of phases B and C are identical with those of the phase A windings.

As shown in FIG. 12, each flared pole face 17 spans three armature slots 52 and three armature teeth 53. Each phase A winding A1-A1', A2-A2' etc. encircles three teeth 53, a first conductor A1 passing in one direction through a first slot, skipping the next two slots and returning as conductor A1' via the third slot. A second phase A winding, A2-A2', has its first conductor A2 sharing the slot occupied by conductor A1', and encircles the next three teeth, returning as conductor A2'. The first conductor A3 of the next phase A winding shares the slot occupied by conductor A2' and encircles the next three slots, returning as conductor A3' and so on.

It should be noted that for the indicated instant position of the rotor poles relative to the phase A windings, phase A winding A1-A1' is positioned opposite a north (N) pole while winding A2-A2' is positioned opposite a south (S) pole. Thus, if the instantaneous polarity of A1-A1' is − to +, as indicated in the plan view of FIG. 12, the instantaneous polarity of winding A2-A2' will be the opposite or + to − as shown. By the same reasoning, the instant polarity of winding A3-A3' is − to + and that of A4-A4' is + to −. To obtain additive voltages for the serially connected windings, then, every other winding is reversed with A2' connected to A1', A2 connected to A3, A3' connected to A4', A4 connected to A5, etc., the same pattern being repeated with the start or A1 conductor of the first winding then serving as a first phase A terminal and the start of the last phase A winding (A16) serving as the second phase A terminal.

Together with the identically connected phase B and phase C windings, the three phases are then connected together in a wye or a delta configuration to drive a three-phase load.

An alternate and perhaps preferred rotor design which is considered to fall within the scope of the present invention might employ an odd number of four-pole elements such as three or five rather than an even number such as four. Such a design would call for two N poles and two S poles for each element in order to achieve alternating N and S poles about the rotor periphery. In this case, the flux emanating from the N poles of a given element would return from the stator core via the S poles of the same element and the spacers could then be of a non magnetic material. With rotation of the rotor as indicated by arrow 23 in FIG. 5, successive pole faces passing a reference point 24 on stator core 12 are alternating north (N) and south (S) poles. For each pair of north and south poles that pass a given stator winding one cycle of output voltage is generated. With eight pairs of north and south poles provided as shown in the drawings for the preferred embodiment, eight cycles of output voltage are generated for each complete rotation of the rotor 10. (For a conventional 4-pole generator only two cycles of output voltage are generated per rotation.) Assuming the generator of the invention as illustrated in FIGS. 1–5 is driven at 3600 RPM (60 revolutions per second) by a 2-pole synchronous motor, the generator will deliver voltage at a frequency of 480 Hertz (60 revolutions per second times 8 pairs of poles).

It has been shown that the high frequency objective has been met by virtue of the large number of poles incorporated in the rotor structure 10; it will also be recognized that the novel rotor structure provides a means for incorporating the large numbers of poles required for so high a generated frequency.

A second important object of the invention is the minimization of audible noise produced by the generator. It is especially important to minimize audible noise at the elevated output frequency because such noise is particularly irritating to the human ear and it stands out from other background noise including that produced by cooling fans and room air conditioning.

One potential cause of audible noise in a high frequency generator of this type is the cyclic variation in the reluctance of the flux path as the pole face moves past the teeth of the stator core. Such a variation in reluctance will produce a pulsating flux in the rotor core at twice the generator output frequency. The resultant magnetostriction in the rotor core produces noise at the same frequency.

The foregoing effect is illustrated in FIG. 6A–6D which shows four successive positions of a pole face as it moves past the stator teeth. In this illustration, the width of the pole face is just great enough to span three stator teeth.

In position (1), the pole face is centered directly above the three stator teeth a, b and c and the reluctance, R, across the air gap is inversely proportional to the sum of the three tooth widths w. Thus, for position (1), $$R_1 = k/3w$$

where k is a constant.

In position (2), the pole face covers only half of tooth a plus teeth b and c and the reluctance is given by $$R_2 = k/2.5w$$

In position (3), the pole face covers only two teeth, b and c and $$R_3 = k/2w$$

In position (4), the pole face again covers 2.5 teeth and $$R_4 = k/2.5w$$

For the illustration of FIGS. 6A–6D then, the Reluctance is seen to vary between a minimum value of k/3w and a maximum value of k/2w.

FIGS. 6E–6H shows four successive positions of the pole face for the present invention in which the four-element core structure permits the use of a wider pole face that covers three stator teeth plus a winding aperture that is assumed equal to tooth width w.

Again, reluctance across the air gap, is inversely proportional to the total tooth width covered for each of the successive pole positions, (1), (2), (3) and (4).

For position (1) three teeth, a, b and c are covered and $$R_1 = k/3w$$

In position (2), the same three teeth are still fully covered and $$R_2 = k/3w$$

In position (3), teeth b and c are still covered plus half of tooth a and half of tooth d. Again a total of three tooth widths are covered so that $$R_3 = k/3w$$

In position (4), three teeth b, c and d are covered and $$R_4 = k/3w$$

The wider pole face of FIGS. 6E–6H is thus shown to provide a constant reluctance value across the air gap. The cyclic reluctance variation shown for the pole dimension of FIG. 6A is therefore seen to be eliminated by the wider pole face of the present invention as shown in FIGS. 6E–6H. An attendant reduction in audible noise is thus to be expected.

In addition to audible noise that results from the cyclic reluctance variation of FIGS. 6A–6D, the reluctance variation produces rotor flux variations and associated core losses in the rotor. The elimination of such cyclic variations in the present invention will thus produce a finite improvement in overall generator efficiency.

Figure 7:
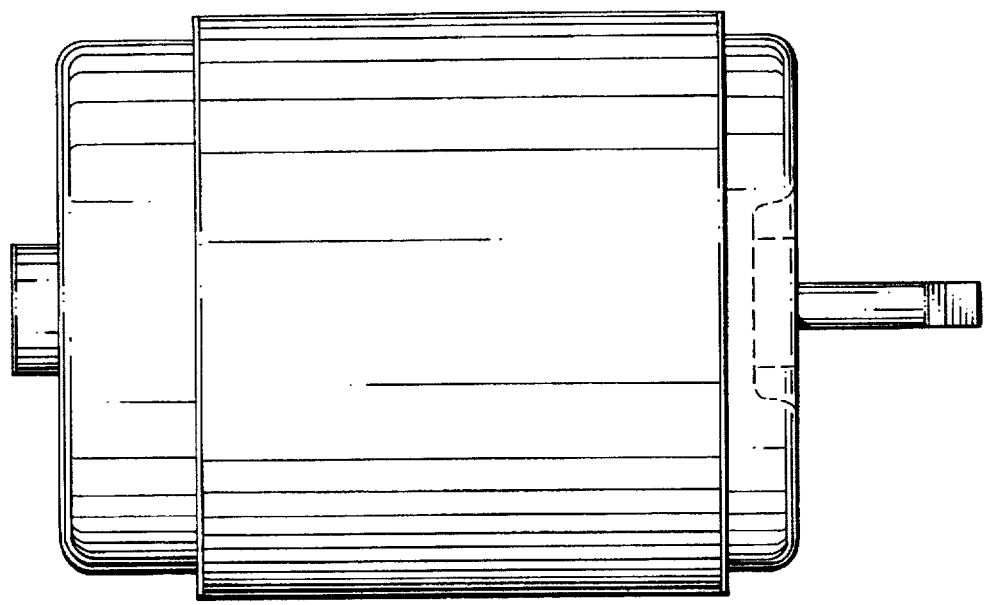
FIG. 7 is a side view of a fully assembled generator incorporating the novel rotor structure of the invention.

While the vertical mounting of the generator as shown in FIG. 1 is often beneficial for large scale computer applications, a more conventional horizontal configuration as shown in FIG. 7 may be preferred for other applications.

In the foregoing description, the rotor structure was shown and described as having four rotor elements of four poles each with a total of sixteen poles. It should be recognized that different combinations of poles per element and elements per rotor may be employed without departing from the teachings of the invention. For example, five elements of four poles each comprises a total of 20 poles with a pole spacing of 18 degrees about the rotor axis.

This combination has at least one advantage over the four-element construction. As shown in FIG. 5, for the four-element construction each element must have either all north poles or all south poles and flux must therefore return via an adjacent element. With a five element rotor and four poles per element, each element will have two north poles and two south poles.

An alternate arrangement for exciting the rotor core 10' of the invention is shown in FIG. 8.

As shown earlier for a first implementation of the invention in FIGS. 2 and 3 and as explained in the foregoing description of the preferred embodiment of the invention, a field winding 18 was carried by each of the four legs 13 of the four core elements 11A through 11D. In this arrangement, sixteen excitation windings were required.

In the alternate arrangement of FIG. 8, the sixteen leg-mounted windings 18 described earlier are replaced by two axial windings 27A and 27C. Winding 27A is wound around magnetic spacer ring 22A encircling ring 22A, while winding 27C is wound around spacer ring 22C in the same fashion. The voltage applied to winding 27A for excitation is polarized to produce a magnetic flux 28 that passes downward through magnetic spacer 22A, radially outward through legs 13 of rotor element 11A, across the air gap between rotor and stator to stator core sector 12AB, from core 12AB, back across the air gap to core element 11B, flowing radially inward through the four legs 13 of core element 11B and back through magnetic spacer 22A.

In the same manner, flux 29 produced by winding 27C flows downward from magnetic spacer ring 27C, radially outward through the four legs of core element 11C to stator core 12CD, and from core 12CD radially inward through the four legs of core element 11D back to magnetic spacer 22C.

To eliminate stray flux paths between the upper and lower flux paths 29 and 28, respectively, the stator core 12 has been separated as shown into upper and lower sectors 12CD and 12AB, with core sector 12AB in alignment with rotor elements 11A and 11B while core sector 12CD is aligned with rotor elements 11C and 11D. Stator windings may be common for core sectors 12AB and 12CD, or they may be wound individually on each core sector as appropriate for individual applications. It will be noted that the arrangement just described produces the magnetic polarization defined earlier for the first embodiment of the invention wherein all four poles of core element 11A and all four poles of core element 11C are north (N) poles while all four poles of each of the other two core elements 11B and 11D are south (S) poles.

Yet another arrangement for exciting the rotor core 10" is shown in FIG. 9. In this arrangement, a single excitation winding 27B is wound around the central magnetic spacer ring 22B. In this arrangement, the flux 32 flows downward from ring 22B to core element 11B and through element 11B and magnetic spacer ring 22A to core element 11A. From elements 11A and 11B flux 32 takes parallel paths through the legs 13 of elements 11A and 11B to stator core 12, returning to spacer ring 22A via parallel paths through the legs of rotor core elements 11C and 11D as shown. In this case, all four poles of each of the lower two elements 11A and 11B are rendered north (N) poles while all four poles of each of the upper two elements 11C and 11D are rendered south (S) poles. This configuration has been found especially beneficial for d-c generators utilizing the core structure of the invention.

Figure 10:
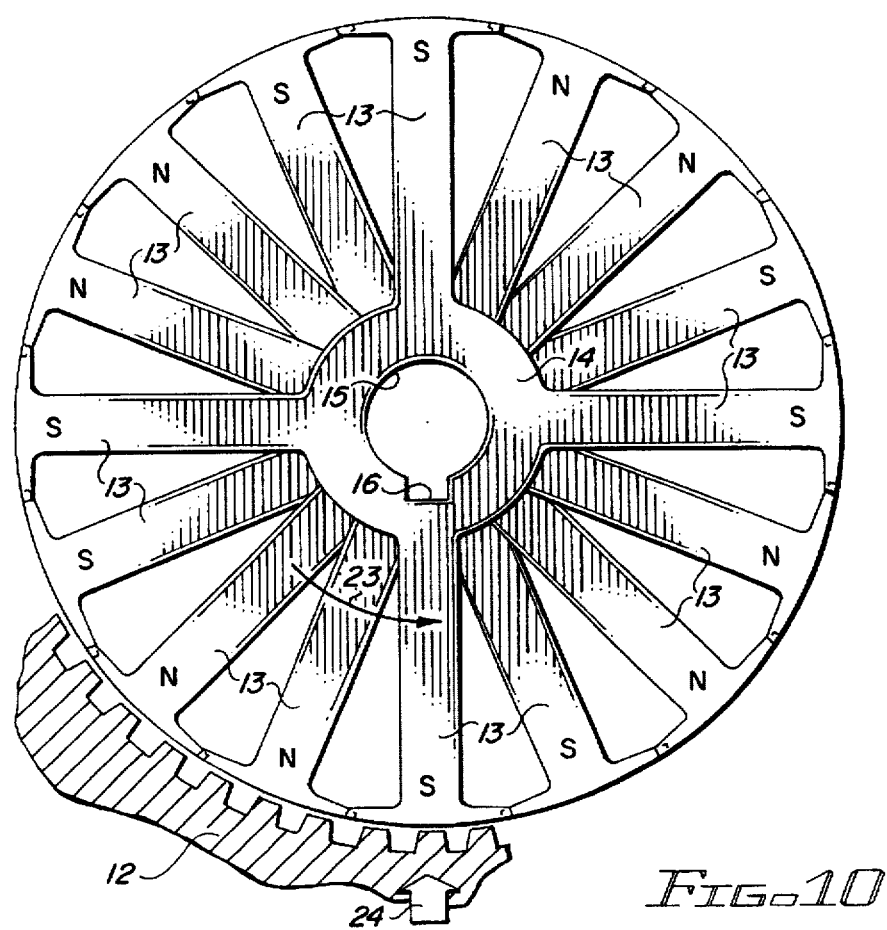
FIG. 10 is an end view of the rotor structure illustrating the sequence of north and south poles about the circumference of the generator rotor.

FIG. 10 shows the sequence of north and south (N) and (S) poles as they pass a reference point 24 with rotation as shown by arrow 23. Note that north and south poles pass the reference point in pairs. This arrangement can be utilized to convert a sixteen pole rotor assembly for eight-pole operation wherein each pair of N or S poles becomes a single pole of twice the original N or S pole span.

The drastic reduction in the number of excitation windings realized by means of the arrangements illustrated in FIGS. 8 and 9 are important enhancements in terms of cost and reliability.

Additional variations of the excitation arrangements are anticipated, including the possibility of incorporating excitation windings over all three spacer rings 22A, 22B and 22C, one or more of which might be employed to balance or intentionally to unbalance parallel flux paths between two or more rotor core elements.

The novel core structure of the invention is applicable to d-c and a-c generators and to three phase as well as single phase machines.

A novel electric generator is thus provided in accordance with the stated objects of the invention. A special four-element rotor is shown to be particularly beneficial for high frequency designs with reduced audible noise and improved electrical efficiency. While only a few embodiments of the invention have been illustrated and described, it will be apparent to those skilled in the art that various changes and modifications may be made therein without departing from the spirit of the invention or from the scope of the appended claims.

What is claimed is:

1. An auxiliary power source comprising:
    an electric generator driven by an electric motor;
    said generator comprising a stator, a rotor and a drive shaft;
    said stator comprising a hollow cylindrically shaped magnetic core having a core stack comprising one or more sectors, each sector defining an opening extending logitudinally through its hollow interior and having electrical conductors installed therein and interconnected to obtain a desired output voltage;
    said rotor comprising:
        at least two core elements;
        at least one magnetic spacer ring;
        at least one field winding; and
        a drive shaft;
    each of said core elements comprising at least two legs extending radially outward from a central hub, said legs being spaced uniformly thereabout and terminating in flared pole faces that face the stator core;
    said core elements being coaxially mounted side by side upon said drive shaft of said rotor inside said stator and the core elements being rotationally oriented thereabout upon said drive shaft of said rotor such that all of said legs of said core elements are uniformly spaced about the circumference of said rotor;
    said core elements being spaced apart longitudinally upon said drive shaft by means of said magnetic spacer rings, there being one of said spacer rings interposed between each set of adjacent core elements; and
    one each of said field windings being wound over at least one of said magnetic spacer rings, said winding encircling said one of said spacer rings and said drive shaft, and said winding being energized by a direct current to produce a magnetic flux traversing a path through said legs of said rotor core elements and said stator core;
    a part of said magnetic flux passing from said rotor via said at least two legs of a first of said core elements into said stator core and returning to said rotor via the said at least two legs of a second of said at least two rotor core elements, thereby producing north (N) poles at said flared pole faces of said first of said at least two core elements and producing south (S) poles at said flared pole faces of said second of said at least two core elements;
    whereby said magnetic flux linking said electrical conductors of said stator induces voltages therein as said rotor is rotationally driven by said electric motor.

2. The auxiliary power source set forth in claim 1 wherein:
    said rotor core comprises:
        first, second, third and fourth core elements;
        first, second and third magnetic spacer rings; and
        first and second rotor field windings;
    each of said core elements having four radially extending legs;
    said core elements and said magnetic spacer rings being arranged along said drive shaft of said rotor, beginning with said first core element and followed in the order listed by said first magnetic spacer ring, said second core element, said second magnetic spacer ring, said third core element, and finally, said fourth core element;
    said first field winding being wound over said first magnetic spacer ring and said second field winding being wound over said third magnetic spacer ring;
    said stator core comprising first and second sectors, said first sector being aligned with said first and said second core elements and said second sector being aligned with said third and said fourth core elements;
    said first field winding being excited and polarized to produce a magnetic flux which passes from said rotor through said legs of said first core element to said first sector of said stator core and back to said rotor through the legs of said second core element, rendering all four pole faces of said first core element north (N) poles and rendering all four pole faces of said second rotor core element south (S) poles;

said second field winding being excited and polarized to produce a magnetic flux which passes from said rotor through said legs of said third core element to said second sector of said stator core and back to said rotor through said legs of said fourth core element, rendering all four pole faces of said third core element north (N) poles and rendering all four pole faces of said fourth core element south (S) poles, said four core elements being axially arranged to produce uniformly spaced, alternately north and south poles about the circumference of said rotor.

3. The auxiliary power source set forth in claim 1 wherein:

said rotor core comprises:
first, second, third and fourth core elements;
first, second and third magnetic spacer rings; and
one rotor field winding;

each of said core elements of said rotor having four radially extending legs;

said core elements and said magnetic spacer rings being arranged in order along said drive shaft of said rotor, beginning with said first core element and followed in the order listed by said first magnetic spacer ring, said second core element of said rotor, said second magnetic spacer ring, said third core element, said third magnetic spacer ring and said fourth core element;

said field winding of said rotor being wound over said second magnetic spacer ring;

said stator core comprising a single, continuous core stack aligned with said first, second, third and fourth core elements of said rotor;

said field winding being excited and polarized to produce a magnetic flux which passes from said rotor through said legs of said first and second core elements to said stator core and back to said rotor through the legs of said third and fourth core elements of said rotor, rendering all four pole faces of said first and second core elements north (N) poles and rendering all four pole faces of said third and fourth core elements south (S) poles;

said four core elements of said rotor being axially arranged to produce uniformly spaced north (N) and south (S) pole pairs about the circumference of said rotor.

4. An auxiliary power source comprising:

an electric generator driven by an electric motor;

said generator comprising a stator, a rotor and a drive shaft in said rotor in line with the output shaft of said motor;

a coupling member directly coupling the shafts of said motor and said generator;

said stator comprising a hollow shaped cylindrical core having an opening extending longitudinally therethrough and having electrical conductors installed therein and interconnected for single-phase or three-phase output voltages;

said rotor comprising at least four core elements coaxially mounted side by side on said drive shaft mounted inside said stator;

each of said core elements comprising four radially extending legs;

the outer extremity of each of said legs is flared to form a pole face that is dimensioned relative to a tooth width of said core such that the total tooth area covered by said pole face is substantially constant and independent of the rotational position of said rotor;

whereby the magnetic reluctance across an air gap formed between said pole face and said core of said stator is substantially independent of said rotor position and the cyclic variation of flux density due to air gap reluctance variations is virtually eliminated as an audible noise source;

said core elements of said rotor being rotationally oriented upon said drive shaft such that the legs of said core elements are uniformly spaced about the circumference of said rotor; and each of said radially extending legs having an electrical conductor wound thereon and excited by a direct current to form a north (N) or south (S) magnetic pole at the outer radial extremity of each of said legs;

said direct current individually polarizing each of said legs such that said magnetic poles formed at the extremities of said legs uniformly spaced about the circumference of said rotor are alternately north (N) and south (S) poles;

whereby each revolution of said rotor causes one cycle of alternating current voltage to be induced in said electrical conductors of said stator for each pair of north and south (S) poles of said rotor.

5. An auxiliary power source comprising:

an electric generator driven by an electric motor;

said generator comprising a stator, a rotor and a drive shaft in said rotor in line with the output shaft of said motor;

a coupling member directly coupling the shafts of said motor and said generator;

said stator comprising a hollow shaped cylindrical core having an opening extending longitudinal therethrough and having electrical conductors installed therein and interconnected for single-phase or three-phase output voltages;

said rotor comprising at least five core elements coaxially mounted side by side on said drive shaft mounted inside said stator;

each of said core elements comprising four legs extending radially outwardly therefrom;

the outer extremity of each of said legs is flared to form a pole face that is dimensioned relative to a tooth width of said core such that the total tooth area covered by said pole face is substantially constant and independent of the rotational position of said rotor;

whereby the magnetic reluctance across an air gap between said pole face and said core of said stator is substantially independent of said rotor position and the cyclic variation of flux density due to air gap reluctance variations is virtually eliminated as an audible noise source;

said core elements of said rotor being rotationally oriented upon said drive shaft such that the legs of said core elements are uniformly spaced about the circumference of said rotor: and each of said radially extending legs having an electrical conductor wound thereon and excited by a direct current to form a north (N) or south (S) magnetic pole at the outer radial extremity of each of said legs;

said direct current individually polarizing each of said legs such that said magnetic poles formed at the extremities of said legs uniformly spaced about the circumferences of said rotor are alternately north (N) and south (S) poles.

whereby each revolution of said rotor causes one cycle of alternating current voltage to be induced in said electrical conductors of said stator for each pair of north (N) and south (S) poles of said rotor.

* * * * *